US012785747B2

(12) United States Patent
Yun et al.

(10) Patent No.: US 12,785,747 B2
(45) Date of Patent: Nov. 3, 2026

(54) ELECTRONIC DEVICE FOR MATCHING ANTENNA IMPEDANCE, AND OPERATION METHOD FOR SAME

(71) Applicant: Samsung Electronics Co., Ltd., Suwon-si (KR)

(72) Inventors: Yongbeen Yun, Suwon-si (KR); Joongkwon Kim, Suwon-si (KR); Jongho Park, Suwon-si (KR); Wonhyung Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 18/526,774

(22) Filed: Dec. 1, 2023

(65) Prior Publication Data

US 2024/0106488 A1 Mar. 28, 2024

Related U.S. Application Data

(63) Continuation of application No. PCT/KR2022/008459, filed on Jun. 15, 2022.

(30) Foreign Application Priority Data

Aug. 12, 2021 (KR) ........................ 10-2021-0106636

(51) Int. Cl.
*H04B 1/40* (2015.01)

(52) U.S. Cl.
CPC ...................................... *H04B 1/40* (2013.01)

(58) Field of Classification Search
CPC ........................................................ H04B 1/40
(Continued)

(56) References Cited

U.S. PATENT DOCUMENTS 5,589,844 A * 12/1996 Belcher .................. H01Q 23/00 333/32
7,813,777 B2 * 10/2010 Boire .................... H03J 1/0008 455/562.1
(Continued)

FOREIGN PATENT DOCUMENTS

KR 101294380 B1 8/2013
KR 20180010883 A 1/2018
(Continued)

OTHER PUBLICATIONS

International Search Report for PCT/KR2022/008459 mailed Sep. 15, 2022, 6 pages.
(Continued)

*Primary Examiner* — April G Gonzales
(74) *Attorney, Agent, or Firm* — Nixon & Vanderhye P.C.

(57) ABSTRACT

According to various embodiments, an electronic device may include: an antenna, an antenna tuner, a transceiver, a power amplifier electrically connected to the antenna tuner and configured to perform power amplification according to an execution of impedance matching, and at least one processor operatively connected to the transceiver, the antenna tuner, and the power amplifier. The at least one processor may be configured to: configure a reference tuner code for the antenna tuner connected to the antenna in a signal path of the transceiver and identify a reflection coefficient of the antenna, calculate a tuner code of the antenna tuner based on whether the identified reflection coefficient of the antenna has been changed and an operation of at least one component of the antenna tuner, and perform the impedance matching of the antenna.

16 Claims, 11 Drawing Sheets

(58) Field of Classification Search
USPC .............................................................. 455/73
See application file for complete search history.

(56) References Cited

U.S. PATENT DOCUMENTS

| | | | | |
|---|---|---|---|---|
| 7,865,154 | B2 * | 1/2011 | Mendolia | H03H 7/40 455/125 |
| 8,351,874 | B2 * | 1/2013 | Dent | H04B 1/0458 330/132 |
| 8,706,053 | B2 * | 4/2014 | Camp, Jr. | H04B 1/18 455/77 |
| 10,110,195 | B2 * | 10/2018 | Tavakol | H03F 3/2171 |
| 10,277,267 | B1 * | 4/2019 | Kerselaers | H04B 1/40 |
| 10,355,662 | B2 * | 7/2019 | Backes | H03H 7/38 |
| 10,673,514 | B1 * | 6/2020 | Klomsdorf | H04B 1/16 |
| 11,218,135 | B2 * | 1/2022 | Morii | H03H 7/40 |
| 12,040,772 | B2 * | 7/2024 | Lenhart | H03H 7/40 |
| 2012/0154069 | A1 * | 6/2012 | Spears | H01Q 1/50 333/17.3 |
| 2012/0212382 | A1 * | 8/2012 | Zhang | H01Q 1/241 343/723 |
| 2014/0167878 | A1 * | 6/2014 | Lee | H03H 7/40 333/124 |
| 2014/0266965 | A1 * | 9/2014 | Herrero | H01Q 1/245 343/861 |
| 2014/0313087 | A1 * | 10/2014 | Jiang | H01Q 3/22 343/745 |
| 2015/0171897 | A1 * | 6/2015 | Premakanthan | H04B 1/04 375/219 |
| 2016/0020814 | A1 * | 1/2016 | Wang | H04B 1/18 455/77 |
| 2016/0182096 | A1 * | 6/2016 | Panioukov | H04B 1/0458 343/861 |
| 2017/0033454 | A1 * | 2/2017 | van Bezooijen | H01Q 1/50 |
| 2017/0264010 | A1 * | 9/2017 | Shi | H04B 1/18 |
| 2017/0272108 | A1 * | 9/2017 | Filipovic | H04B 1/0458 |
| 2018/0026369 | A1 * | 1/2018 | Kim | H04B 17/12 343/850 |
| 2018/0242334 | A1 * | 8/2018 | Kim | H04W 72/542 |
| 2019/0253087 | A1 * | 8/2019 | Domino | H04B 1/0458 |
| 2021/0091805 | A1 * | 3/2021 | Park | H04B 1/0458 |

FOREIGN PATENT DOCUMENTS

| | | | |
|---|---|---|---|
| KR | 20200083255 | A | 7/2020 |
| KR | 20200097475 | A | 8/2020 |
| KR | 102200490 | B1 | 1/2021 |

OTHER PUBLICATIONS

Written Opinion of the ISA for PCT/KR2022/008459 mailed Sep. 15, 2022, 4 pages.
Korean Office Action issued Oct. 17, 2025 in corresponding Korean Patent Application No. 10-2021-0106636.
Korean Office Action dated Jul. 15, 2026 for KR Application No. 10-2021-0106636.

* cited by examiner

ELECTRONIC DEVICE FOR MATCHING ANTENNA IMPEDANCE, AND OPERATION METHOD FOR SAME

CROSS-REFERENCE TO RELATED APPLICATIONS

This application is a continuation of International Application No. PCT/KR2022/008459 designating the United States, filed on Jun. 15, 2022, in the Korean Intellectual Property Receiving Office and claiming priority to Korean Patent Application No. 10-2021-0106636, filed on Aug. 12, 2021, in the Korean Intellectual Property Office, the disclosures of each of which are incorporated by reference herein in their entireties.

BACKGROUND

Field

The disclosure relates to an apparatus and method for matching antenna impedance in an electronic device.

Description of Related Art

With the development of the mobile communication technology, various electronic devices having a communication function, such as smartphones or wearable devices, come into wide use. Such an electronic device may perform wireless communication with an external electronic device using at least one antenna. Impedance of the antenna may affect transmission efficiency of the antenna for wireless communication.

The electronic device may match impedance of the antenna in order to increase transmission efficiency of the antenna. The impedance matching of the antenna may be different depending on various propagation environments or an environment in which the electronic device is used. Accordingly, it is necessary to enable maximum power transfer transmission through the antenna by matching impedance of the antenna with optimal impedance.

An electronic device may perform the matching of antenna impedance by applying a tunable code corresponding to impedance of an antenna. For example, the tunable code corresponding to impedance of the antenna may be multiple (e.g., 65), each tunable code may be stored in each index of a reflection coefficient lookup table, and a tuner code corresponding to an index most close to a current reflection coefficient of the antenna may be calculated with reference to the lookup table.

However, the electronic device may have a problem in that optimal impedance matching of an antenna is difficult through only a tuner code selected with reference to an index of the lookup table due to various use situations. Furthermore, an optimal tunable code for antenna impedance matching may be selected when even a configuration of a ground code in which a characteristic of a ground that controls the length of the antenna is taken into consideration is taken into consideration.

SUMMARY

Embodiments of the disclosure provide an apparatus and method for applying an optimal tunable code for antenna impedance matching in an electronic device.

According to various example embodiments, an electronic device may include: an antenna, an antenna tuner, a transceiver, a power amplifier electrically connected to the antenna tuner and configured to perform power amplification according to an execution of impedance matching, and at least one processor operatively connected to the transceiver, the antenna tuner, and the power amplifier. The at least one processor may be configured to: configure a reference tuner code for the antenna tuner connected to the antenna in a signal path of the transceiver and identify a reflection coefficient of the antenna, calculate a tuner code of the antenna tuner based on whether the identified reflection coefficient of the antenna has been changed and an operation of at least one component of the antenna tuner, and perform the impedance matching of the antenna.

According to various example embodiments, a method of operating an electronic device may include: applying a reference tuner code to an antenna tuner connected to a signal path of an antenna, identifying a reflection coefficient of the antenna, calculating a tuner code of the antenna tuner based on whether the identified reflection coefficient of the antenna has been changed and an operation of at least one component of the antenna tuner, and performing impedance matching of the antenna.

According to various example embodiments, the electronic device can obtain improved antenna efficiency by calculating a tuner code by calculation based on a reflection coefficient of an antenna in various use situations and performing impedance matching using the tuner code.

According to various example embodiments, the electronic device can reduce resources for calculation and perform efficient calculation by dividing reflection coefficients into two areas in calculating a tuner code and calculating a tuner code based on the reflection coefficients.

According to various example embodiments, the electronic device can incorporate antenna impedance according to a change in the reflection coefficient in real time by improving the antenna impedance in a way to minimize and/or reduce the number of cases of combinations of switches and variable capacitors within a tuner in calculating a tuner code.

According to various example embodiments, an optimal ground code can be selected through the least memory by least selecting indices stored when the ground code is selected in various use situations.

According to various example embodiments, an S parameter for configuring a ground code may be derived, and an optimal ground code may be selected based on the S parameter. Accordingly, optimal antenna impedance can be matched in a way to perform impedance matching by applying a tunable code including an optimal tuner code and an optimal ground code.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
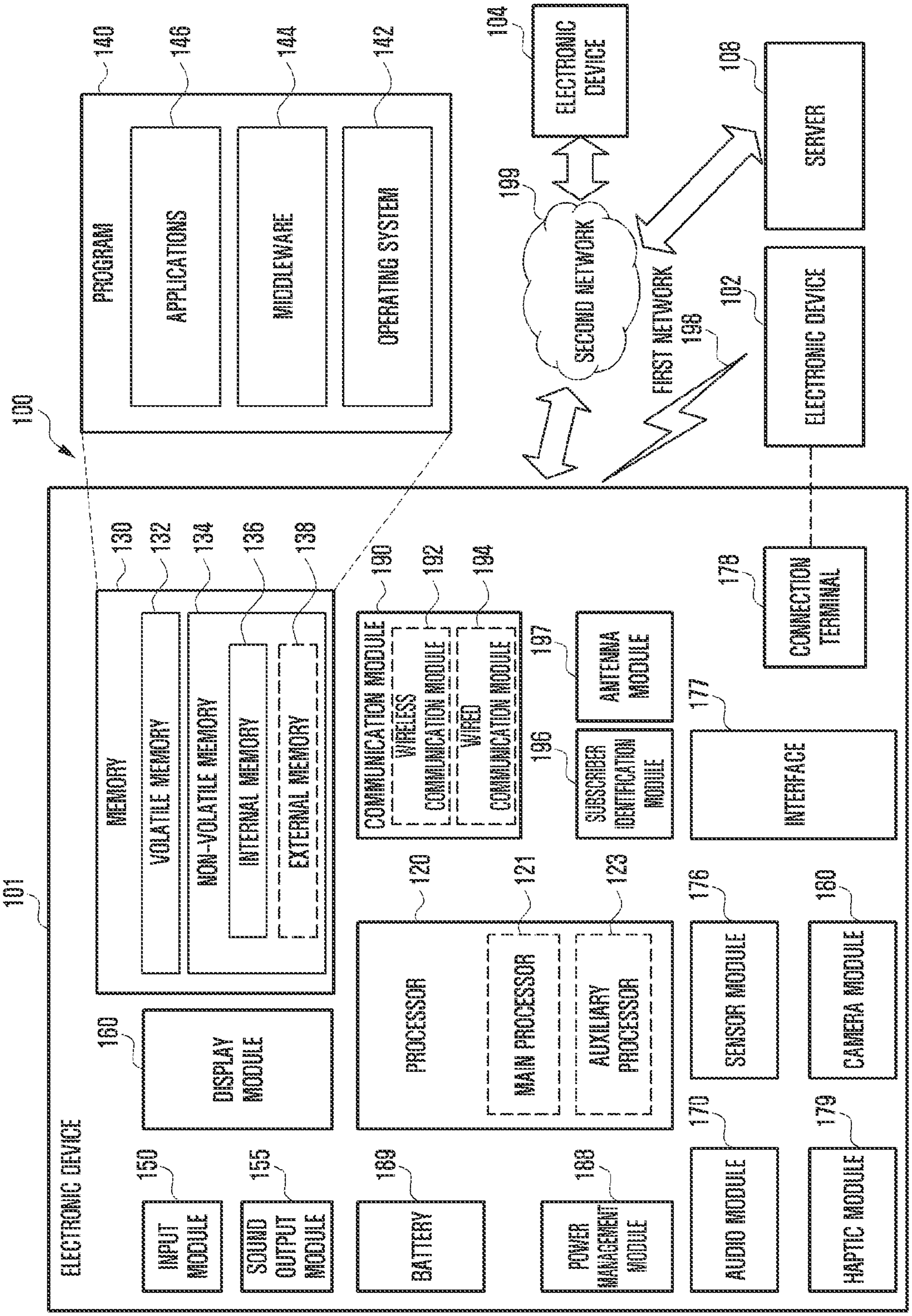
FIG. 1 is a block diagram illustrating an example electronic device in a network environment according to various embodiments.

Hereinafter, various example embodiments are described in greater detail with reference to the accompanying drawings. Embodiments and terms used in the embodiments are not intended to limit the technology described in this disclosure to a specific embodiment, but should be understood as including various changes, equivalents and/or alternatives of a corresponding embodiment. Regarding the description of the drawings, similar reference numerals may be used in similar components. An expression of the singular number may include an expression of the plural number unless clearly defined otherwise in the context.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196. The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197. According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), the element may be coupled with the other element directly (e.g., wiredly), wirelessly, or via a third element.

As used in connection with various embodiments of the disclosure, the term “module” may include a unit implemented in hardware, software, or firmware, or any combination thereof, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
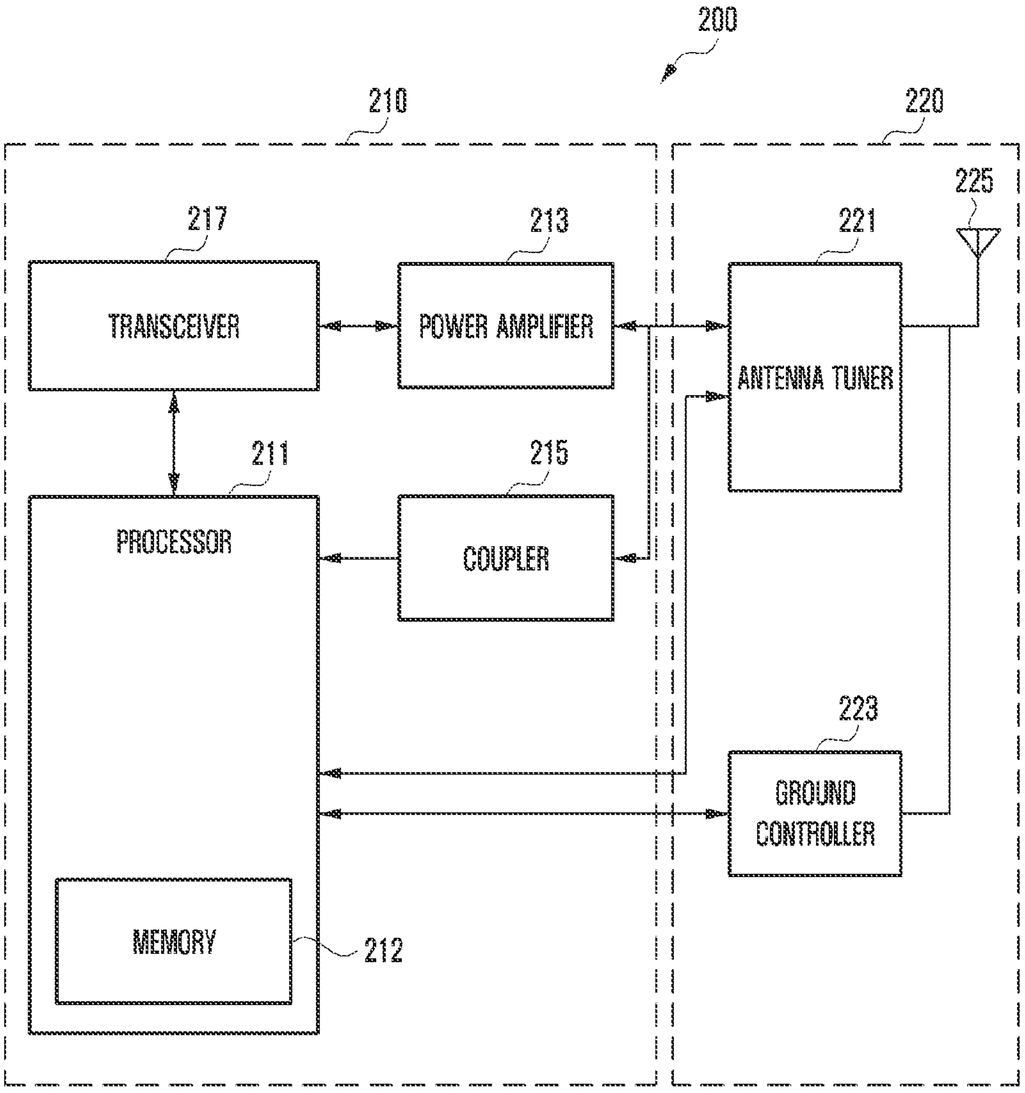
FIG. 2 is a block diagram illustrating an example configuration of an electronic device for matching antenna impedance according to various embodiments.

FIG. 2 is a block diagram illustrating an example configuration of an electronic device 200 (e.g., the electronic device 101 in FIG. 1) for matching antenna impedance according to various embodiments.

With reference to FIG. 2, the electronic device 200 may include a communication module (e.g., including communication circuitry) 210 (e.g., the communication module 190 in FIG. 1) and an antenna module (e.g., including an antenna) 220 (e.g., the antenna module 197 in FIG. 1).

According to an embodiment, the communication module 210 may include a processor (e.g., including processing circuitry) 211, a memory 212, a power amplifier 213, a coupler 215, and a transceiver 217. According to an embodiment, the antenna module 220 may include an antenna tuner 221, a ground controller (e.g., including circuitry) 223, and an antenna 225.

According to an embodiment, the processor 211 may be electrically connected to other components (e.g., the power amplifier 213, the coupler 215, the transceiver 217, the antenna tuner 221, and the ground controller 223), may transmit and/or receive signals, and may control operations thereof or perform the processing and/or operation of various data. For example, the processor 211 may include a communication processor (CP) or an application processor (AP).

According to an embodiment, the transceiver 217 may convert, into an RF signal (e.g., a Tx signal), data received from the processor 211, and may output the RF signal to the power amplifier 213. Furthermore, the transceiver 217 may convert an RF signal (e.g., an Rx signal), received from the power amplifier 213, into digital data which may be encoded by the processor 211, and may deliver the digital data to the processor 211. According to an embodiment, the amplifier 213 may include a power amplifier and a low noise amplifier. The power amplifier may amplify power of an RF signal (e.g., a Tx signal) received from the transceiver 217, and may transmit the RF signal to the antenna tuner 221. The low noise amplifier may amplify power of an RF signal (e.g., an Rx signal) received from the antenna tuner 221 while minimizing and/or reducing noise of the RF signal, and may transmit the RF signal to the transceiver.

According to various embodiments, the antenna tuner 221 may adjust impedance of the antenna 225 in a way to be close to at least one piece of reference impedance based on a tuner code selected or calculated by the processor 211. For example, the antenna tuner 221 may include at least one of a switch, a resistor, an inductor, or a capacitor. For example, the antenna tuner 221 can reduce reflection attributable to an impedance difference between the antenna 225 and the communication module 210 by adjusting an electrical length (e.g., a capacitor, an inductor, or a resistor) between the antenna 225 and the communication module 210 based on a tuner code.

According to various embodiments, the ground controller 223 may change a resonant frequency by adjusting an electrical length between the antenna 225 and a ground based on a ground code selected by the processor 211. The ground controller 223 can reduce reflection occurring due to an impedance difference between the antenna 225 and the communication module 210 through a change in the resonant frequency.

According to an embodiment, the processor 211 may control the ground controller 223 based on a communication frequency. For example, the processor 211 may adjust the length of the antenna 225 by controlling the ground controller (Xgnd) 223.

According to an embodiment, the processor 211 may control the antenna tuner 221 in order to match impedance of the antenna 225 based on a communication frequency. For example, the processor 211 may receive a feedback signal (e.g., a forward coupling signal or a reverse coupling signal) from the coupler 215 and calculate a current antenna load (or antenna impedance). The coupler 215 may be coupled with a signal line between the power amplifier 213 and the antenna tuner 221, and may transmit, to the processor 211, a feedback signal corresponding to a communication signal by outputting the feedback signal. The processor 211 may identify a reflection coefficient ($\Gamma_i$) (hereinafter referred to as an input reflection coefficient) that views the antenna 225 at the input of the antenna tuner 221 based on a ratio of reverse and forward voltages of the feedback signal.

According to an embodiment, in order to calculate a reflection coefficient ($\Gamma_L$) (antenna impedance) (hereinafter referred to as an output reflection coefficient) that views the antenna 225 at the output of the antenna tuner 221, a value at which the output reflection coefficient is matched with optimal impedance (e.g., about 50Ω) may be defined as a reference reflection coefficient (e.g., about 50Ω), an antenna ground code corresponding to the reference reflection coefficient may be configured as a reference ground code, and a tuner code of the antenna tuner 221 configured so that the input reflection coefficient ($\Gamma_i$) of the tuner 221 becomes the smallest may be configured as a reference tuner code.

According to an embodiment, I, Q information of the input reflection coefficient ($\Gamma_i$) may be stored in accordance with 65 indices (index[0], index[1], . . . ), for example. An output reflection coefficient may be calculated by applying, to each index, the stored input reflection coefficient and an S parameter ($\Gamma_L$) of the antenna tuner 221. A value having the highest gain may be calculated as each optimal tuner code. These values may be stored in the memory 212 as a lookup table.

In this case, the input reflection coefficient ($\Gamma_i$), the S parameter, and the output reflection coefficient ($\Gamma_L$) may be calculated based on Equation 1 below.

$$\Gamma_i = \frac{S_{11} + \Gamma_L(S_{12}S_{21} - S_{11}S_{22})}{1 - \Gamma_L S_{22}} \quad \text{[Equation 1]}$$

According to an embodiment, the processor 211 may select a tuner code with reference to S parameters (values $S_{11}$, $S_{12}$, $S_{21}$, $S_{22}$) stored in the memory 212 and apply the tuner code to the antenna tuner 221, and may perform an operation of identifying impedance of an antenna corresponding to a reference tuner code and changing a tuner code. If a specific tuner code is inputted to the antenna tuner 221, impedance corresponding to the specific tuner code may be changed into optimal impedance (e.g., about 50Ω) for communication.

According to an embodiment, the processor 211 may select, from a lookup table, an index closest to an output reflection coefficient ($\Gamma_L$) derived from an input reflection coefficient ($\Gamma_i$) measured through the current coupler 215, may change the output reflection coefficient ($\Gamma_L$) into a size similar to impedance (e.g., about 50Ω) having a low $S_{11}$ by applying a ground code of the selected index, and may then optimize the changed impedance as antenna impedance having a high $S_{21}$ by applying a specific tuner code.

According to an embodiment, the processor 211 may control the ground controller 223 based on a communication frequency. For example, the processor 211 may adjust the length of the antenna 225 by controlling the ground controller 223. In this case, the processor 211 may configure a tuner code as a reference tuner code, may measure an input reflection coefficient ($\Gamma_i$) by the ground controller 223, and may configure, as a reference ground code, a value at which the measured input reflection coefficient ($\Gamma_i$) is close to a reference index (e.g., index[0]) or optimal impedance (e.g., about 50Ω).

According to an embodiment, the processor 211 may apply a reference tuner code to a reference ground code in a specific use situation (e.g., the insertion of an ear jack, holding by a hand, or mounting on a case), may determine an index closest to a measured input reflection coefficient ($\Gamma_i$), may calculate an optimal ground code for each specific use situation, and may store the optimal ground code in a lookup table in accordance with a corresponding index. For example, the processor 211 may apply a tuner code as a reference tuner code in a specific use situation, may measure an input reflection coefficient ($\Gamma_i$) while changing a ground code, and may calculate, as an optimal ground code, a value at which the input reflection coefficient ($\Gamma_i$) is close to a reference index or optimal impedance.

According to an embodiment, the processor 211 may represent indices as an impedance graph (e.g., a smart chart). The impedance graph may be stored in the form of a lookup table. For example, the processor 211 may determine an index close to a current output reflection coefficient among the indices on the impedance graph, may select a ground code stored in the index so that the current output reflection coefficient is changed into optimal impedance with reference to the lookup table based on the determined index, and may change the current output reflection coefficient.

According to an embodiment, the power amplifier 213 may amplify a signal received from the transceiver 217 and deliver the signal to the antenna tuner 221, under the control of the processor 211.

According to an embodiment, the antenna tuner 221 may transmit a signal received from the power amplifier 213 through the antenna 225 or may deliver a signal received through the antenna 225 to the transceiver 217 through the power amplifier 213.

According to an embodiment, the ground controller 223 may adjust the length of the antenna 225. For example, the ground controller 223 may include at least one switch (not illustrated), may control an operation of at least one switch based on a ground code received from the processor 221, and may change the length of the antenna 225 based on a connection state of the at least one switch.

Figure 3:
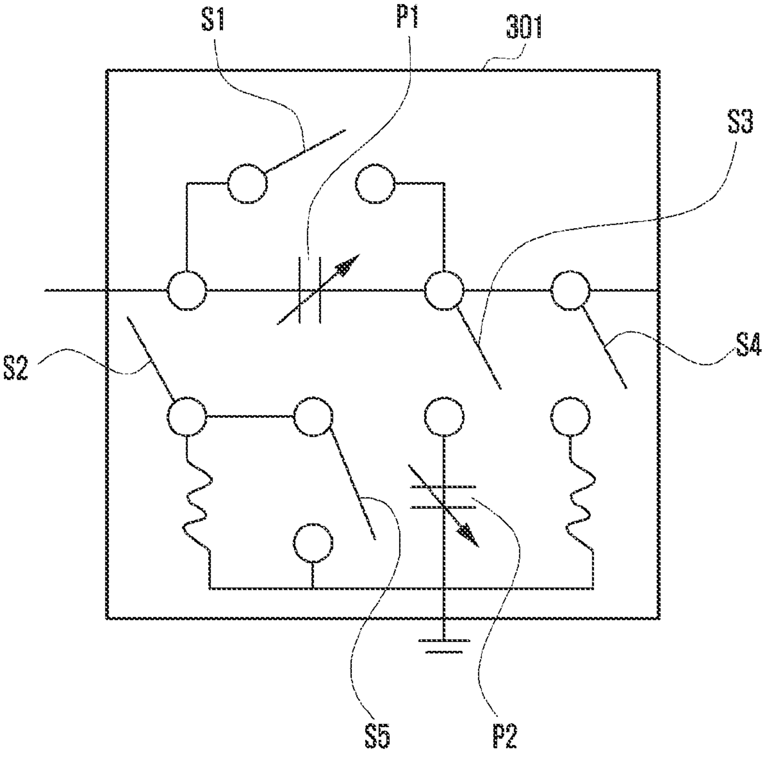
FIG. 3 is a diagram illustrating components of a tuner of an electronic device according to various embodiments.

FIG. 3 is a diagram illustrating various example components of a tuner (e.g., the antenna tuner 221 in FIG. 2) of an electronic device (e.g., the electronic device 200 in FIG. 2) according to various embodiments.

According to an embodiment, the tuner 221 may include an impedance control circuit 301, such as that illustrated in FIG. 3. The impedance control circuit 301 may include at least one switch (e.g., S1, S2, S3, S4, and S5) and at least one passive element (e.g., a variable capacitor or an inductor) P1 and P2. According to an embodiment, the tuner 221 may operate (e.g., turn on or turn off) each of the switches in accordance with a tuner code received from a processor (e.g., the processor 221 in FIG. 2). When receiving the tuner code from the communication processor 211, at least one switch may operate, and impedance of an antenna (e.g., the antenna 225 in FIG. 2) may be determined based on a connection state of at least one passive element. The number of switches, the number of passive elements, and connection structures therefor in FIG. 3 are examples, and may be variously changed.

According to an embodiment, the impedance control circuit 301 of the tuner 221 may apply a basic ground code and a basic tuner code as a tunable code, measure an input reflection coefficient ($\Gamma_i$) through a coupler (e.g., the coupler 215 in FIG. 2), and identify an output reflection coefficient ($\Gamma_L$) using an basic S parameter of the tuner 211, under the control of the processor 211.

According to an embodiment, an S parameter according to an electrical characteristic of the tuner 221 may be primarily generated as, for example, a list of 16384 S parameters upon measurement of a full range. Some of a list of S parameters secondarily selected among the list of 16384 S parameters, for example, a list of 1536 S parameters may be stored in a memory (e.g., the memory 212 in FIG. 2).

According to an embodiment, an S parameter according to an electrical characteristic of the tuner 221 may be thirdly selected as, for example, 96 (64+32) or less S parameters based on an operation of at least one component of the tuner 221.

According to an embodiment, a structure of the components of the impedance control circuit 301 of the tuner 221 is described. Upon turn-on or turn-off operation of a first switch S1 that is a serial switch, a value of an input reflection coefficient ($\Gamma_i$) according to a change in the switches S2, S3, and S4 and a second variable capacitor P2 that are connected in parallel to the first switch S1, for example, whether a phase of the input reflection coefficient ($\Gamma_i$) is changed may be different. For example, upon turn-on operation of the first switch S1, although a value of a first variable capacitor P1 connected in series to the first switch S1 is changed, an input reflection coefficient ($\Gamma_i$) may not be changed. When the first switch S1 is turned off, if values of the first variable capacitor P1 that is connected in series to the first switch S1 and the switches S2, S3, and S4 and the second variable capacitor P2 that are connected in parallel to the first switch S1 are changed, a phase of the input reflection coefficient ($\Gamma_i$) may be changed.

Figure 4:
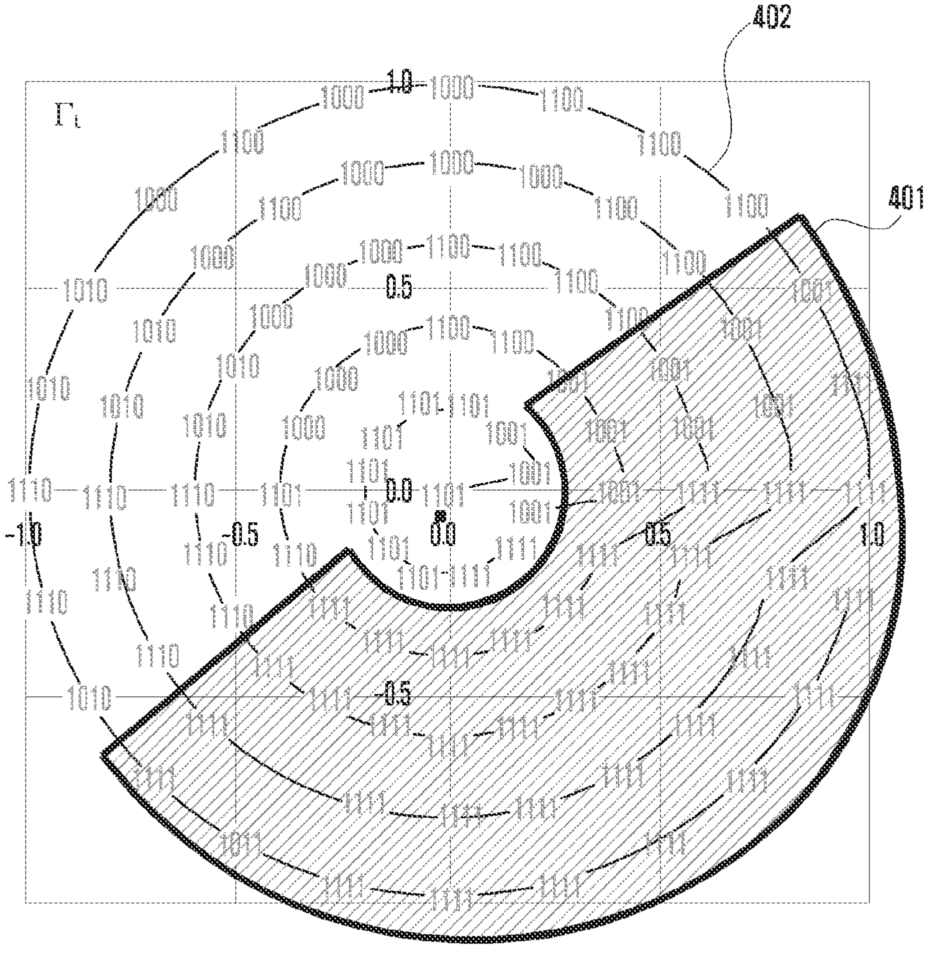
FIG. 4 is a graph illustrating coordinate values for selecting a tuner code corresponding to antenna impedance according to various embodiments.

FIG. 4 is a graph illustrating coordinate values for selecting a tuner code corresponding to antenna impedance according to various embodiments.

With reference to FIG. 4, in order to calculate an optimal tuner code using coordinate values on a graph from a given output reflection coefficient ($\Gamma_L$) based on secondarily selected S parameters, for example, 1536 S parameters, an area in which the first switch S1 needs to be turned on and an area in which the first switch S1 needs to be turned off with respect to each output reflection coefficient value may be divided from each other. For example, the first switch S1 may need to be turned on in a first area 401 on the graph. For example, the first switch S1 may need to be turned off in a second area 402 on the graph.

According to an embodiment, the processor 211 may extract a change value of a value of the second variable capacitor P2, as 8, for example, in the turn-on operation area 401 of the first switch S1 of the tuner 221, and may calculate each optimal tuner code using an S parameter corresponding to a total of 64 cases to each of which a value at which each of the second switch S2, the third switch S3, and the fourth switch S4 has been on or off has been applied.

According to an embodiment, the processor 211 may configure a value of the first variable capacitor P1 as a fixed value, for example, a maximum value (Max) in the turn-off operation area 402 of the first switch S1 of the tuner 221, may extract a change value of a value of the second variable capacitor P2, for example, 8, and may calculate each optimal tuner code using an S parameter corresponding to a total of 64 cases to each of which a value at which each of the second switch S2, the third switch S3, and the fourth switch S4 has been on or off has been applied.

According to an embodiment, the processor 211 may obtain an input reflection coefficient ($\Gamma_i$) measured by applying an S parameter, a reference tuner code, and an optimal ground code corresponding to an operation of at least one component of the tuner 221, and may calculate, as a tuner code, a value having the greatest gain based on Equation 2 below.

$$G_T = \frac{(1-|\Gamma_S|^2)}{|1-\Gamma_i\Gamma_S|}|s_{21}|^2\frac{(1-|\Gamma_L|^2)}{|1-S_{22}\Gamma_L|^2} \quad \text{[Equation 2]}$$

wherein $G_T$ may be a gain, $\Gamma_i$ may be an input reflection coefficient, and $\Gamma_s$ may be a reference reflection coefficient (e.g., 50Ω).

Figure 5:
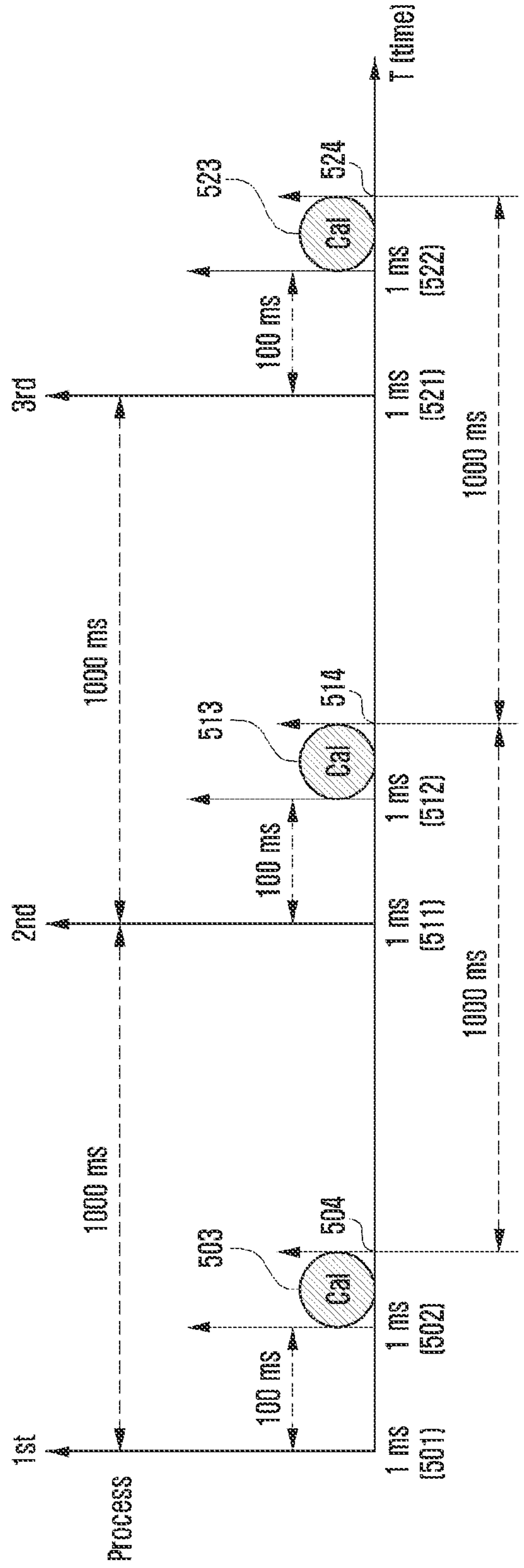
FIG. 5 is a diagram illustrating a cycle in which antenna impedance is measured according to various embodiments.

FIG. 5 is a diagram illustrating a cycle in which an electronic device (e.g., the electronic device 200 in FIG. 2) measures antenna impedance according to various embodiments.

According to an embodiment, a processor (e.g., the processor 211 in FIG. 2) of the electronic device 200 may update a tunable code in a designated time cycle. The tunable code may include a ground code and a tuner code.

According to an embodiment, the processor 211 may primarily measure an input reflection coefficient ($\Gamma_i$) within one cycle (e.g., within one second), may update a ground code, may secondarily measure an input reflection coefficient ($\Gamma_i$) based on the updated ground code, may calculate a tuner code, and may update a tunable code. The primary measurement and the secondary measurement within the cycle may be performed at designated time intervals.

The processor 211 may update a tuner code and a ground code in a designated cycle as in one second, for example. When a first cycle is initially started, the processor 211 may configure a reference tuner code and a reference ground code at primary timing 501, and may measure an input reflection coefficient ($\Gamma_i$). Accordingly, the processor 211 may calculate an output reflection coefficient ($\Gamma_L$), and may update the ground code with a ground code corresponding to an adjacent index[n] among indices of a lookup table. In the first cycle, the processor 211 may measure an input reflection coefficient ($\Gamma_i$) by applying the updated ground code and the reference tuner code at secondary timing 502. Accordingly, the processor 211 may calculate an output reflection coefficient ($\Gamma_L$), may calculate (503) a tuner code by applying the corresponding output reflection coefficient and an S parameter of the tuner code to Equation 2, and may update (504) the final tunable code in the first cycle. In the first cycle, S parameters having combinations of 64 types of the second switch S2, third switch S3, fourth switch S4, second variable capacitor P2 and the first switch S1 or first variable capacitor P1 (Max) of the antenna tuner may be used.

In a second cycle, at primary timing 511, the processor 211 may configure a reference tuner code and a reference ground code and measure an input reflection coefficient ($\Gamma_i$). Accordingly, the processor 211 may calculate an output reflection coefficient ($\Gamma_L$), and may update the ground code with a ground code corresponding to an adjacent index[n] among the indices of the lookup table. In the second cycle, at secondary timing 512, the processor 211 may measure an input reflection coefficient ($\Gamma_i$) by applying the updated ground code and the reference tuner code. Accordingly, the processor 211 may calculate an output reflection coefficient ($\Gamma'_L$), may compare the calculated output reflection coefficient ($\Gamma'_L$) with the output reflection coefficient ($\Gamma_L$) in the first cycle, may calculate (513) a tuner code by applying 16 or 32 types of S parameters to the first capacitor P1 in the tuner code of the first cycle if a difference is not present between the calculated output reflection coefficient ($\Gamma'_L$) and the output reflection coefficient ($\Gamma_L$), and may update (514) the final tunable code of the second cycle. The processor 211 performs the process of the first cycle again if there is a difference by comparing the calculated output reflection coefficient ($\Gamma'_L$) with the output reflection coefficient ($\Gamma_L$) in the first cycle.

Likewise, in a third cycle, the processor 211 may perform a tunable code update process (521, 522, 523, and 524). Accordingly, since a tuner code and/or a ground code may be updated based on an input reflection coefficient ($\Gamma_i$) measured through two steps in each cycle, an optimal tunable code may be calculated and applied to various use situations.

Figure 6:
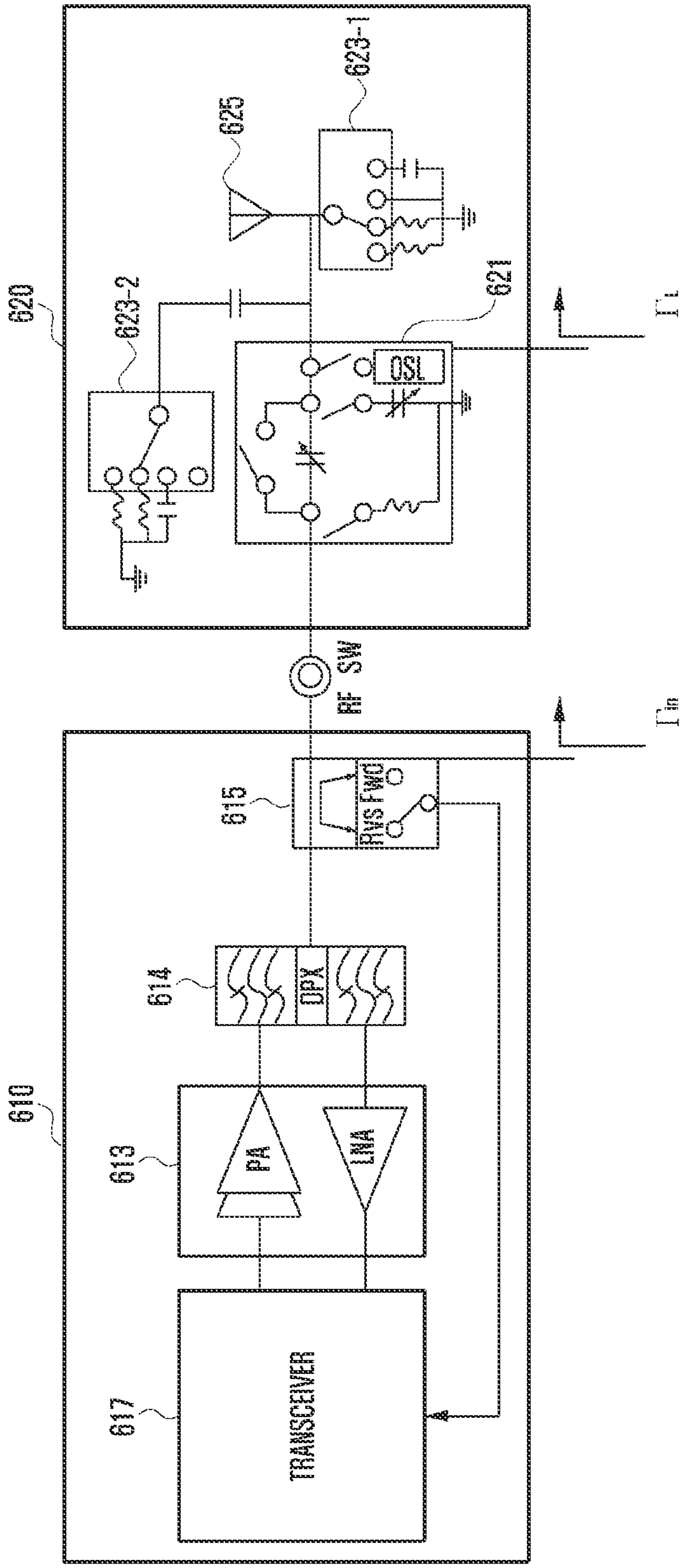
FIG. 6 is a block diagram illustrating an example configuration of an electronic device according to various embodiments.

FIG. 6 is a block diagram illustrating an example configuration of an electronic device according to various embodiments.

With reference to FIG. 6, the electronic device 200 may include a communication module (e.g., including communication circuitry) 610 (e.g., the communication module 190 in FIG. 1) and an antenna module (e.g., including an antenna) 620 (e.g., the antenna module 197 in FIG. 1).

According to an embodiment, the communication module 610 may include an amplifier 613, a phase modulator 614, a coupler 615, and a transceiver 617. According to an embodiment, the antenna module 620 may include an antenna tuner 621, at least one ground controller 623_1 and 623-2, and an antenna 625.

According to an embodiment, a processor (not illustrated) (e.g., the processor 120 in FIG. 1 or the processor 211 in FIG. 2) may transmit and/or receive signals to and/or from other components (e.g., the phase modulator 612, the power amplifier 613, the phase modulator 614, the coupler 615, and the transceiver 617), and may control operations thereof or perform the processing and/or operation of various data. For example, the processor may include a communication processor (CP) or an application processor (AP).

According to an embodiment, a Tx signal amplified through the power amplifier 613 may be delivered to the antenna tuner 621 through the phase modulator 614 and transmitted through the antenna 625.

According to an embodiment, an Rx signal received through the antenna 625 may be phase-modulated in the phase modulator 614 through the antenna tuner 621, may be then amplified in the power amplifier 613, and may be delivered to the transceiver 617.

According to an embodiment, the ground controller 623 may adjust the length of the antenna 625. For example, the ground controller 623 may include at least one switch, and may control an operation of the at least one switch based on a ground code received from the processor and may change the length of the antenna 625 based on a connection state of the at least one switch.

According to an embodiment, the processor may control the at least one ground controller 623-1 and 623-2 based on a communication frequency. For example, the processor 211 may adjust the length of the antenna 625 by controlling the at least one ground controller 623-1 and 623-2. In this case, the two ground controllers 623-1 and 623-2 have been adopted and are an example, and one or a plurality of ground controllers may be adopted.

According to an embodiment, the processor may control the at least one ground controller 623-1 and 623-2 in order to match impedance of the antenna 625 based on a communication frequency. For example, the processor may calculate a current antenna load (or antenna impedance) by fixing a tuner code of the tuner 621 to a basic tuner code and receiving a feedback signal (e.g., a forward coupling signal or a reverse coupling signal) from the coupler 615 while changing a ground code of the at least one ground controller 623-1 and 623-2. The coupler 615 may be connected to a signal line between the power amplifier 613 and the antenna tuner 621, and may deliver, to the processor, the feedback signal corresponding to a communication signal by outputting the feedback signal. The processor may identify an input reflection coefficient ($\Gamma_i$) that views the antenna 625 at the input of the tuner 621 based on a ratio of reverse and forward voltages of the feedback signal.

According to an embodiment, a ground code value having the smallest input reflection coefficient ($\Gamma_i$) may be configured as a reference ground code by fixing a tuner code of the tuner 621 to a reference tuner code and receiving a feedback signal from the coupler 615 while changing a ground code of the at least one ground controller 623-1 and 623-2.

According to an embodiment, an optimal ground code may be selected depending on various use situations based on a reference ground code.

Figure 7A:
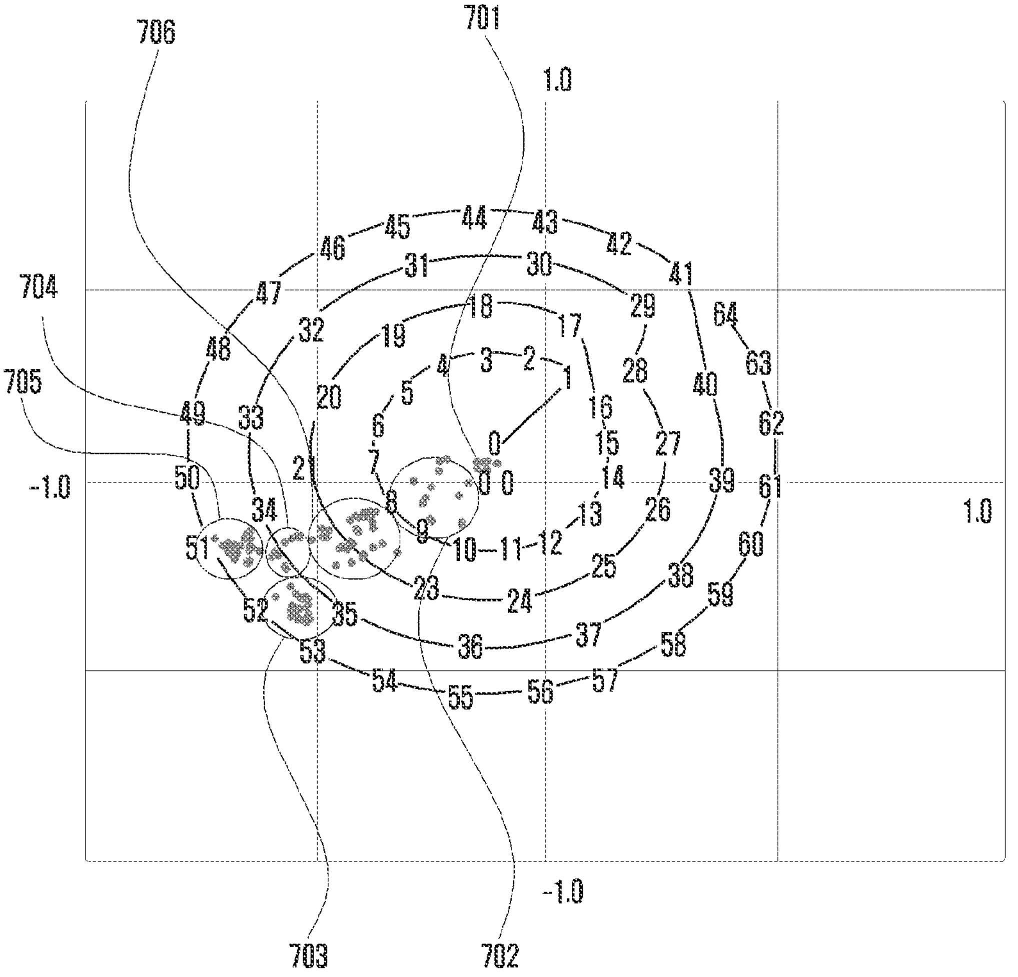
FIGS. 7A and 7B are graphs for selecting a ground code depending on a situation in which an electronic device is used according to various embodiments.
Figure 7B:
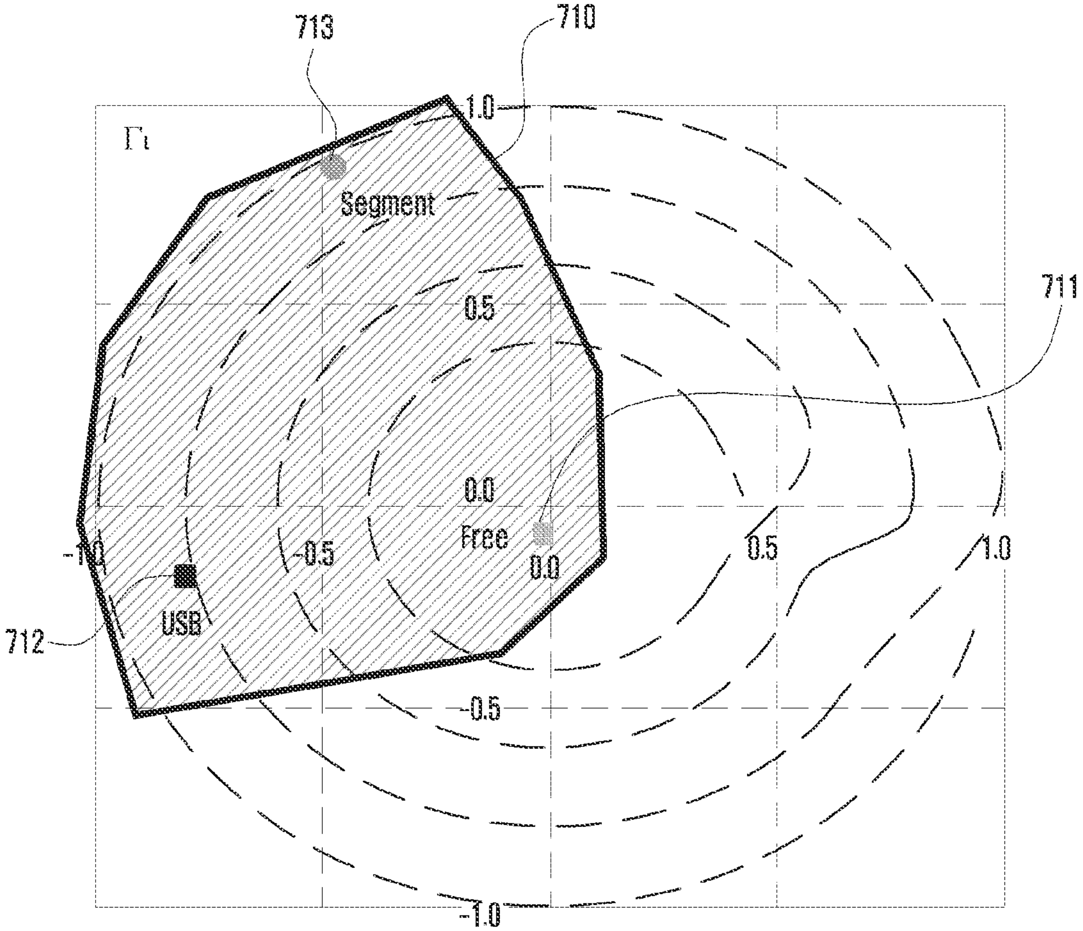

FIGS. 7A and 7B are index graphs for selecting a ground code depending on a situation in which an electronic device is used according to various embodiments.

With reference to FIG. 7A, it may be seen that if a reference ground code is applied, an input reflection coefficient is measured depending on various use situations for the electronic device 200, and an output reflection coefficient is indicated in an index graph, an output reflection coefficient in a case where the electronic device 200 is not used (free) may be indicated an area 701. Furthermore, it may be seen that an output reflection coefficient in a case where a case is mounted on the electronic device 200 is indicated in an area 702, an output reflection coefficient in a case where a USB has been inserted into the electronic device 200 is indicated in an area 703, an output reflection coefficient in a case where the electronic device 200 is wirelessly charged is indicated in an area 704, an output reflection coefficient in a case where the electronic device 200 is held by a hand is indicated in an area 705, and an output reflection coefficient in the case of a finger touch is indicated in an area 706. Accordingly, the utilization of indices may be increased by reducing the memory using only some (e.g., 10) of 65 indices or by constructing a lookup table including all the 65 indices within a limited area because the indices are concentrated on limited areas in various use situations.

FIG. 7B is a graph for enabling the 65 indices to be variously used with respect to various use situations according to various embodiments. For example, the 65 indices are used as information on which a reflection coefficient of a ground code corresponding to each use situation may be obtained and an S parameter of the ground code may be obtained by changing ground codes corresponding to various use situations so that the 65 indices are disposed within a triangular range 710 including three use situations (e.g., a case where the electronic device 200 is free (711), a case where a USB has been inserted into the electronic device 200 (712), and a case where the electronic device 200 is held by a hand (713)) located at the farthest.

According to an embodiment, a ground code value having the smallest input reflection coefficient ($\Gamma_i$), which is measured by configuring a tuner code of the tuner 621 as a reference tuner code and changing a ground code of the at least one ground controller 623-1 and 623-2, may be configured as a reference ground code.

According to an embodiment, the processor may apply a reference tuner code and a reference ground code, may measure input reflection coefficients for various use situations, and may select two or more use situations in which a distance from a case where the electronic device 200 is not used, which corresponds to an index[0], is the farthest and a distance between cases is the greatest by making the measured input reflection coefficients correspond to an index graph. For example, in FIG. 7A, the situation 703 in which a USB has been inserted into the electronic device 200 and the situation 705 in which the electronic device 200 is held by a hand, which have the greatest distance with respect to the situation 701 in which the electronic device 200 is not used, may be selected.

According to an embodiment, the processor may obtain an output reflection coefficient for three use situations, including the situation 703 in which a USB has been inserted into the electronic device 200 and the situation 705 in which the electronic device 200 is held by a hand in addition to the situation 701 in which the electronic device 200 is not used using input reflection coefficients for the three use situations and an S parameter of a reference tuner code through Equation 3 below.

$$\Gamma_L = \frac{\Gamma_i - S_{11}}{S_{22}\Gamma_i - (S_{11}S_{22} - S_{12}S_{21})} \quad \text{[Equation 3]}$$

wherein $S_{11}$, $S_{12}$, $S_{21}$, and $S_{22}$ are S parameter values of the tuner 621. An output reflection coefficient ($\Gamma_L$) for the three use situations may be calculated by applying the input reflection coefficients for the three use situations, respectively, as input reflection coefficients ($\Gamma_i$).

According to an embodiment, the processor may apply a reference tuner code to the tuner 621, and may calculate an S parameter for the at least one ground controller 623-1 and 623-2 based on Equation 4 below while changing a ground code of the at least one ground controller 623-1 and 623-2 using input reflection coefficients for the three use situations and the calculated output reflection coefficient. In order to calculate a total of three variables of $$S'_{11}, S'_{12}, \text{ and } S'_{21} * S'_{22}$$

of the S parameter for each ground code, input reflection coefficients ($\Gamma_i$) having three conditions and an output reflection coefficient (ii) may be necessary.

$$\Gamma_L = \frac{\Gamma_i - S'_{11}}{S'_{22}\Gamma_i - (S'_{11}S'_{22} - S'_{12}S'_{21})} \quad \text{[Equation 4]}$$

wherein $$S'_{11}, S'_{12}, S'_{21}, \text{ and } S'_{22}$$

are S parameter values of the at least one ground controller 623-1 and 623-2, and may be calculated by applying the input reflection coefficients ($\Gamma_i$) for the three use situations and the output reflection coefficient ($\Gamma_L$).

According to an embodiment, the processor may select a ground code value having the smallest input reflection coefficient, which is calculated while changing an S parameter of the at least one ground controller 623-1 and 623-2 with respect to each index corresponding to a specific reflection coefficient in the index graph of FIG. 7B, as an optimal ground code based on Equation 5 below, and may store the selected ground code value in each index.

$$\Gamma_i = \frac{S_{11} + \Gamma_L(S'_{12}S'_{21} - S'_{11}S'_{22})}{1 - \Gamma_L S'_{22}} \quad \text{[Equation 5]}$$

wherein $$S'_{11}, S'_{12}, S'_{21}, \text{ and } S'_{22}$$

are S parameter values of the at least one ground controller 623-1 and 623-2. A ground code value calculated to have the smallest input reflection coefficient ($\Gamma_i$) with respect to each of designated output reflection coefficients ($\Gamma_L$) may be calculated as an optimal ground code.

In the embodiment, selecting the three use situations including the situation in which the electronic device 200 is not used is an example. A selected situation and the number of situations correspond to the number of indices corresponding to a specific reflection coefficient, and the number of situations is not limited. For example, four or more use situations may be selected.

According to various example embodiments, an electronic device (e.g., the electronic device 101 in FIG. 1 or the electronic device 200 in FIG. 2) may include: an antenna (e.g., the antenna 225 in FIG. 2), an antenna tuner (e.g., the antenna tuner 221 in FIG. 2), a transceiver (e.g., the transceiver 217 in FIG. 2), a power amplifier (e.g., the power amplifier 213 in FIG. 2) electrically connected to the antenna tuner and configured to perform power amplification according to the execution of impedance matching, and at least one processor (e.g., the processor 211 in FIG. 2) operatively connected to the transceiver, the antenna tuner, and the power amplifier. The at least one processor may be configured to: configure a reference tuner code for the antenna tuner connected to the antenna in a signal path of the transceiver, identify a reflection coefficient of the antenna, calculate a tuner code of the antenna tuner based on whether the identified reflection coefficient of the antenna has been changed and an operation of at least one component of the antenna tuner, and perform the impedance matching of the antenna.

According to various example embodiments, the at least one processor may be configured to: compare the reflection coefficient of the antenna with a previous reflection coefficient of the antenna, and calculate the tuner code of the antenna tuner based on whether the first switch of the antenna tuner is on or off based on a difference between the reflection coefficient and the previous reflection coefficient as a result of the comparison.

According to various example embodiments, based on the first switch being on, the at least one processor may be configured to: maintain, as the existing value, a value of the first variable capacitor connected in series to the first switch, and calculate the tuner code of the antenna tuner based on at least one of the on or off of at least another switch connected in parallel to the first switch and a change in the voltage of a second variable capacitor connected in parallel to the first switch.

According to various example embodiments, based on the first switch being off, the at least one processor may be configured to: maintain, as a maximum voltage, a value of the first variable capacitor connected in series to the first switch, and calculate the tuner code of the antenna tuner based on at least one of the on or off of at least another switch connected in parallel to the first switch and a change in the voltage of the second variable capacitor.

According to various example embodiments, based on a difference not being present as a result of the comparison, the at least one processor may be configured to: update the tuner code of the antenna tuner based on a change in the voltage of the first variable capacitor connected in series to the first switch of the antenna tuner.

According to various example embodiments, the at least one processor may be configured to: perform, based on the reflection coefficients of the antenna identified in different cycles, the operation of updating the tuner code based on a difference not being present and based on a difference being present as a result of the comparison.

According to various example embodiments, the at least one processor may be configured to apply the reference tuner code to the antenna tuner and select a ground code of at least one ground controller connected to a signal path of the antenna.

According to various example embodiments, the at least one processor may be configured to: apply the reference tuner code to the antenna tuner and determine a reference ground code of the at least one ground controller by measuring the at least one reflection coefficient, apply the reference tuner code to the antenna tuner, apply the reference ground code to the at least one ground controller, measure a reflection coefficient for each of a plurality of use situations, calculate an S parameter of the at least one ground controller based on the measured reflection coefficients for the plurality of use situations, and determine the ground code of the ground controller based on the S parameter of the ground controller and the measured reflection coefficients.

According to various example embodiments, the at least one processor may be configured to store the S parameter and ground code of the ground controller.

According to various example embodiments, the at least one processor may be configured to identify the reflection coefficient by applying the selected ground code to the at least one ground controller and applying the reference tuner code to the antenna tuner and to update the tuner code of the antenna tuner based on whether the at least one component of the antenna tuner operates based on whether the identified reflection coefficient has been changed.

Figure 8:
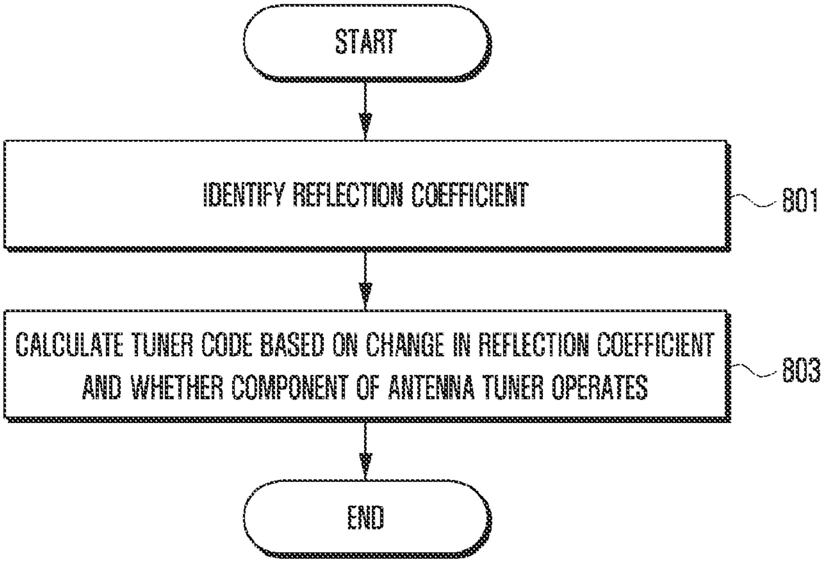
FIG. 8 is a flowchart illustrating an example method of matching, by an electronic device, antenna impedance according to various embodiments.

FIG. 8 is a flowchart illustrating an example method of matching, by an electronic device, antenna impedance according to various embodiments.

FIG. 8 is a flowchart illustrating an example of matching antenna impedance in an electronic device according to various embodiments. In an embodiment below, operations may be sequentially performed, but are not essentially sequentially performed. For example, the sequence of the operations may be changed, and at least two operations may be performed in parallel. In this case, the electronic device may be the electronic device 101 in FIG. 1 or the electronic device 200 in FIG. 2. Hereinafter, in the description of at least some operations in FIG. 8, a part described above with reference to the aforementioned drawings may not be repeated.

According to an embodiment, in operation 801, a processor (e.g., the processor 211 in FIG. 2) of the electronic device 200 may configure, as a reference tuner code, a tuner code of an antenna tuner (e.g., the antenna tuner 221 in FIG. 2) connected to a signal path of an antenna (e.g., the antenna 225 in FIG. 2), and may identify a reflection coefficient (e.g., antenna impedance) of the antenna.

According to an embodiment, in operation 803, the processor may perform impedance matching of the antenna by calculating and updating a tuner code of the antenna tuner in a configured way, based on whether the identified reflection coefficient of the antenna has been changed and whether at least one component of the antenna tuner operates. For example, the processor may compare the identified reflection coefficient of the antenna with a previous reflection coefficient of the antenna, and may calculate a tuner code of the antenna tuner based on whether at least one component (e.g., the first switch S1) of the antenna tuner operates (e.g., on or off) if there is a difference as a result of the comparison. For example, the first switch S1 may be a switch connected in series to a transmission line of Tx and Rx signals.

When the first switch S1 is on, the processor may maintain, as the existing value, a value of the first variable capacitor P1 connected in parallel to the first switch S1, and may calculate a tuner code of the antenna tuner based on an on and off operation of the at least another switch S2, S3, and S4 connected in parallel to the first switch S1 and an S parameter corresponding to a combination of values of the second variable capacitor P2 connected through the at least another switch S2, S3, S4, or S5.

When the first switch S1 is off, the processor may maintain, as the greatest value, a value of the first variable capacitor P1 connected in parallel to the first switch S1, and may calculate a tuner code of the antenna tuner based on an on and off operation of the at least another switch S2, S3, and S4 connected in parallel to the first variable capacitor P1 and an S parameter corresponding to a combination of values of the second variable capacitor P2 connected through the at least another switch S2, S3, S4, or S5.

According to an embodiment, the processor may compare an identified reflection coefficient of the antenna with a previous reflection coefficient of the antenna, and may calculate a tuner code of the antenna tuner based on an S parameter corresponding to a combination of values of the first variable capacitor P1 in the existing tuner code if a difference is not present as a result of the comparison.

Each of the aforementioned operations of identifying a reflection coefficient of the antenna, comparing the reflection coefficient with a previous reflection coefficient of the antenna, and updating a tuner code may be performed within one different cycle (e.g., a 1-second cycle).

Figure 9:
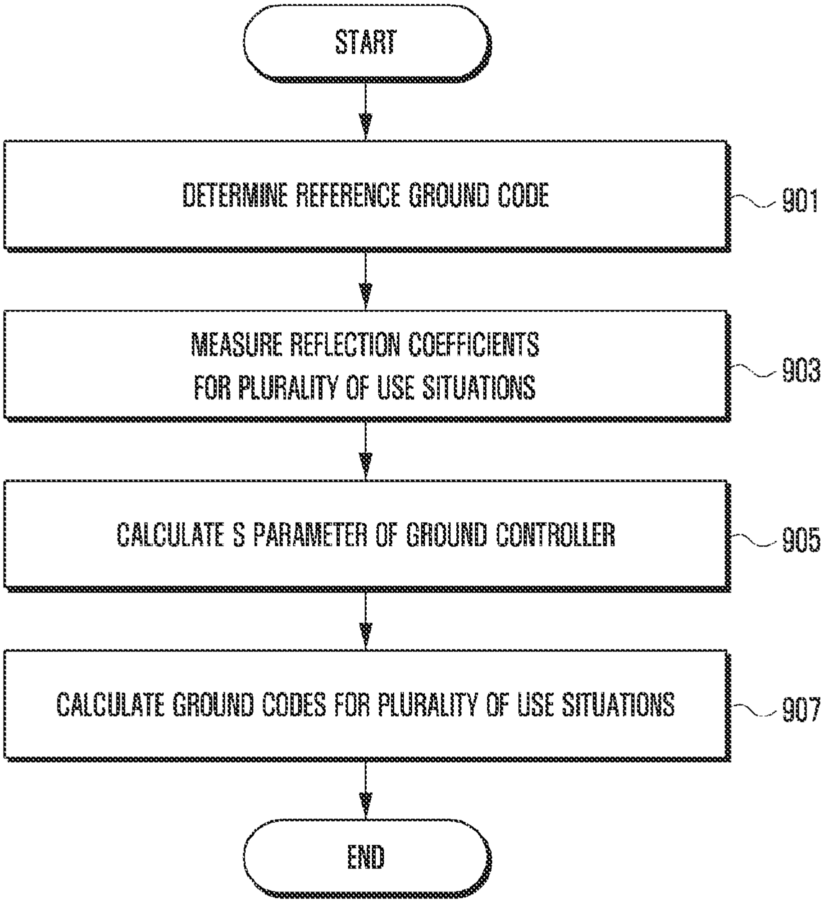
FIG. 9 is a flowchart illustrating an example operation of calculating, by an electronic device, a ground code for impedance matching according to various embodiments.

FIG. 9 is a flowchart illustrating an example operation of calculating, by an electronic device, a ground code for impedance matching according to various embodiments.

FIG. 9 is a flowchart illustrating an example of matching antenna impedance in an electronic device according to various embodiments. In an embodiment below, operations may be sequentially performed, but are not essentially sequentially performed. For example, the sequence of the operations may be changed, and at least two operations may be performed in parallel. Furthermore, the operations in FIG. 9 may be additionally and alternatively performed with respect to the operations in FIG. 8. In this case, the electronic device may be the electronic device 101 in FIG. 1 or the electronic device 200 in FIG. 2. Hereinafter, in the description of at least some operations in FIG. 9, a part described above with reference to the aforementioned drawings may not be repeated.

According to an embodiment, a processor (e.g., the processor 211 in FIG. 2) may apply a reference tuner code to an antenna tuner (e.g., the antenna tuner 221 in FIG. 2 or the antenna tuner 621 in FIG. 6), and may select a ground code of at least one ground controller (e.g., the ground controller 213 in FIG. 2 or the ground controller 623-1 and 623-2 in FIG. 6) connected to a signal path of an antenna (e.g., the antenna 225 in FIG. 2 or the antenna 625 in FIG. 6).

According to an embodiment, in operation 901, in order to select a ground code, the processor may apply the reference tuner code to the antenna tuner, and may determine a reference ground code of the at least one ground controller by measuring a reflection coefficient. For example, the processor may determine, as a reference ground code, a ground code value having the smallest input reflection coefficient ($\Gamma_i$) by fixing a tuner code of the tuner to a reference tuner code and measuring an input reflection coefficient ($\Gamma_i$) while changing a ground code of the at least one ground controller 523-1 and 623-2.

In operation 903, the processor may apply the reference tuner code to the antenna tuner, may apply the reference ground code to the at least one ground controller, and may measure a reflection coefficient for each of a plurality of use situations. Various use situations may include a case where an electronic device is not used (free), a case where a case is mounted on an electronic device, a case where a USB has been inserted into an electronic device, a case where an electronic device is wirelessly charged, a case where an electronic device is held by a hand, or a case where an input is performed on an electronic device by a touch of a finger, for example.

According to an embodiment, in operation 905, the processor may calculate an S parameter of the at least one ground controller based on the measured reflection coefficients for the plurality of use situations. For example, the processor may measure an input reflection coefficient for each of the plurality of use situations, and may calculate an output reflection coefficient using a reference tuner code for a corresponding situation and an S parameter of the tuner. For example, an S parameter of the at least one ground controller may be calculated using the input reflection coefficient measured and the output reflection coefficient calculated by applying a reference tuner code for each of the plurality of use situations and the S parameter of the tuner.

According to an embodiment, in operation 907, the processor may determine a ground code of the at least one ground controller for each of the plurality of use situations based on the calculated S parameter of the at least one ground controller and the measured reflection coefficient. For example, the processor may select, as an optimal ground code, a ground code value having the smallest input reflection coefficient, which is calculated while changing an S parameter of the at least one ground controller with respect to a designated output reflection coefficient.

According to an embodiment, the processor may store, in a memory (e.g., the memory 212 in FIG. 2), the calculated S parameter and the calculated ground code for the plurality of use situations of the at least one ground controller.

According to an embodiment, the processor may apply a selected ground code to the at least one ground controller, may identify a reflection coefficient of the antenna by applying a reference tuner code to the antenna tuner, and may update a tuner code of the antenna tuner in a configured way based on an operation of at least one component (e.g., the first switch S1 or the first capacitor P1) of the antenna tuner based on whether the identified reflection coefficient is identical with a previous reflection coefficient.

Figure 10:
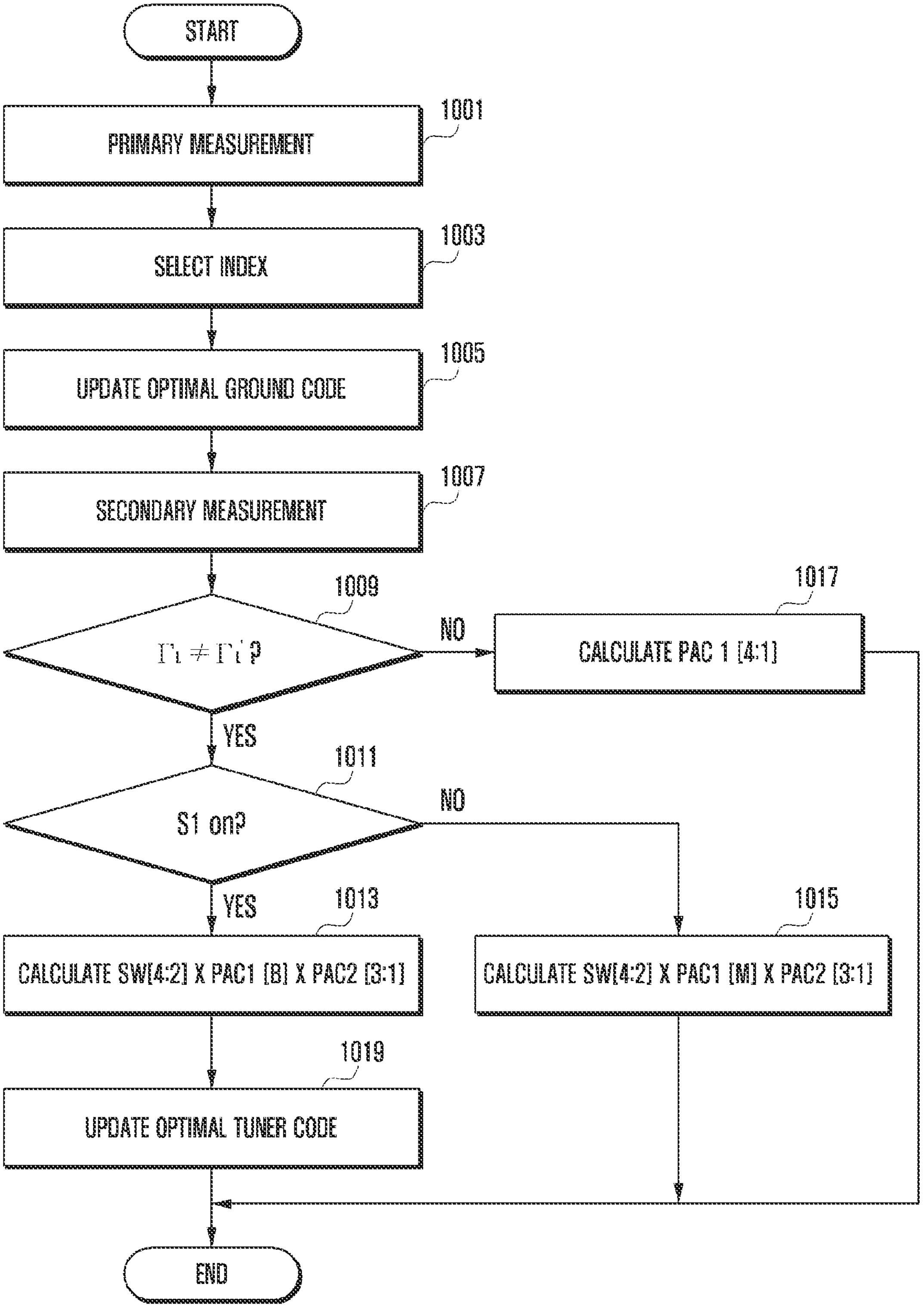
FIG. 10 is a flowchart illustrating an example method of matching antenna impedance in an electronic device according to various embodiments.

FIG. 10 is a flowchart illustrating an example method of matching antenna impedance in an electronic device according to various embodiments.

FIG. 10 is a flowchart illustrating an example of matching antenna impedance in an electronic device according to various embodiments. In an embodiment below, operations may be sequentially performed, but are not essentially sequentially performed. For example, the sequence of the operations may be changed, and at least two operations may be performed in parallel. In this case, the electronic device may be the electronic device 101 in FIG. 1 or the electronic device 200 in FIG. 2. Hereinafter, in the description of at least some operations in FIG. 10, a part described above with reference to the aforementioned drawings may not be repeated.

According to an embodiment, a processor (e.g., the processor 211 in FIG. 2) of the electronic device 200 may update a tunable code at intervals of a designated time cycle (e.g., 1 second). The tunable code may include a ground code and a tuner code.

According to an embodiment, the processor 211 may update a tunable code within one cycle by primarily measuring an input reflection coefficient ($\Gamma_i$) within one cycle, calculating an output reflection coefficient ($\delta_L$) and updating a ground code, secondarily measuring an input reflection coefficient $$(\Gamma_i')$$

based on the updated ground code, and calculating an output reflection coefficient $$(\Gamma_L')$$

and updating a tuner code. The primary measurement and the secondary measurement within one cycle may be performed at designated time intervals.

When a first cycle is initially started, in operation 1001, the processor may primarily configure a reference tuner code of the tuner, may configure a reference ground code of the ground controller, may measure an input reflection coefficient ($\Gamma_i$), and may calculate an output reflection coefficient ($\Gamma_L$) based on the input reflection coefficient ($\Gamma_1$).

In operation 1003, the processor may calculate a distance for the calculated output reflection coefficient ($\Gamma_L$) on an index graph, and may select an index having the closest index. In operation 1005, the processor may update a corresponding ground code with an optimal ground code with reference to a lookup table with respect to the selected index.

In operation 1007, the processor may secondarily apply the reference tuner code to the tuner, may measure an input reflection coefficient $$(\Gamma_i')$$

by applying the updated ground code, and may calculate an output reflection coefficient $$(\Gamma_L').$$

The secondary measurement may be performed at timing at which 100 ms, for example, has elapsed from primary measurement timing within the first cycle (e.g., 1 second).

According to an embodiment, the processor may update a tuner code based on an operation of at least one component of the tuner.

In operation 1009, the processor may determine whether the output reflection coefficient ($\Gamma_L$) calculated at the primary timing and the output reflection coefficient $$(\Gamma_L')$$

calculated at the secondary timing have been changed.

When the output reflection coefficient $(\Gamma_L')$ calculated at the primary timing of the first cycle and the output reflection coefficient ($\Gamma_L$) calculated at the primary timing of the second cycle are different from each other, in operation 1011, the processor may identify whether coordinates of the reflection coefficient are coordinates of a reflection coefficient in which the first switch of the tuner needs to be on or off. The first switch of the tuner may be a switch connected in series to a Tx and Rx signal line of the tuner.

In case that it is checked that the first switch S1 is on in operation 1011, the processor may proceed to operation 1013, may maintain, as the existing value, a value of the first variable capacitor P1 connected in parallel to the first switch S1, and may calculate a tuner code of the antenna tuner based on at least one of an on and off operation of at least another switch S2, S3, and S4 connected in parallel to the first switch S1 and a change in the value of the second variable capacitor P2 connected through the at least another switch S2, S3, S4, or S5.

In case that it is checked that the first switch S1 is off in operation 1011, the processor may proceed to operation 1015, may maintain, as the greatest value, a value of the first variable capacitor P1 connected in parallel to the first switch S1, and may calculate a tuner code of the antenna tuner based on at least one of an on and off operation of the at least another switch S2, S3, and S4 connected in parallel to the first switch S1 and a change in the value of the second variable capacitor P2 connected through the at least another switch S2, S3, S4, or S5.

According to an embodiment, when the output reflection coefficient ($\Gamma_L$) calculated at the primary timing and the output reflection coefficient $(\Gamma_L')$ calculated at the secondary timing do not have a difference as a result of the comparison in operation 1009, in operation 1017, the processor may calculate and update a tuner code of the antenna tuner based on an operation (e.g., a voltage change) of at least one component (e.g., the first capacitor P1) of the antenna tuner.

Operation 1011 and operation 1017 that are performed by being branched based on a result of the comparison between the output reflection coefficient ($\Gamma_L$) calculated at the primary timing and the output reflection coefficient $(\Gamma_L')$ calculated at the secondary timing in operation 1009 may be performed in different cycles.

As the aforementioned operations are performed, when a next cycle is started after a tuner code and/or a ground code are updated, the updated tuner code and ground code values may be maintained, a reference ground code and a reference tuner code may be configured at primary timing of timing (1 ms) at which a reflection coefficient is measured, and a modified ground code and a modified reference tuner code may be configured at secondary timing of the timing (1 ms).

According to various example embodiments, an example method of operating an electronic device (e.g., the electronic device 101 in FIG. 1 or the electronic device 200 in FIG. 2) may include: applying a reference tuner code to an antenna tuner (e.g., the antenna tuner 221 in FIG. 2) connected to a signal path of an antenna (e.g., the antenna 225 in FIG. 2) and identifying a reflection coefficient of the antenna, calculating a tuner code of the antenna tuner based on whether the identified reflection coefficient of the antenna has been changed and an operation of at least one component of the antenna tuner, and performing impedance matching of the antenna.

According to various example embodiments, the method may further include: comparing the reflection coefficient of the antenna with a previous reflection coefficient of the antenna and calculating the tuner code of the antenna tuner based on the on or off of the first switch of the antenna tuner based on a difference being present as a result of the comparison.

According to various example embodiments, based on the first switch being on, the method may further include: maintaining, as the existing value, a value of the first variable capacitor connected in series to the first switch, and calculating the tuner code of the antenna tuner based on at least one of the on or off of at least another switch connected in parallel to the first switch and a change in the voltage of a second variable capacitor connected in parallel to the first switch.

According to various example embodiments, based on the first switch being off, the method may further include: maintaining, as a maximum voltage, a value of the first variable capacitor connected in series to the first switch, and calculating the tuner code of the antenna tuner based on at least one of the on or off of at least another switch connected in parallel to the first switch and a change in the voltage of the second variable capacitor connected in parallel to the first switch.

According to various example embodiments, based om a difference not being present as a result of the comparison, the method may further include updating the tuner code of the antenna tuner based on a change in the voltage of the first variable capacitor connected in series to the first switch of the antenna tuner.

According to various example embodiments, the method may further include performing, based on the reflection coefficients of the antenna identified in different cycles, updating the tuner code based on a difference not being present and a based on a difference being present as a result of the comparison.

According to various example embodiments, the method may further include: applying the reference tuner code to the antenna tuner and selecting a ground code of at least one ground controller connected to a signal path of the antenna.

According to various example embodiments, the selecting the ground code may further include: applying the reference tuner code to the antenna tuner and determining a reference ground code of the at least one ground controller by measuring the at least one reflection coefficient, applying the reference tuner code to the antenna tuner, applying the reference ground code to the at least one ground controller, measuring a reflection coefficient for each of a plurality of use situations, calculating an S parameter of the at least one ground controller based on the measured reflection coefficients for the plurality of use situations, and determining the ground code of the ground controller based on the S parameter of the ground controller and the measured reflection coefficients.

According to various example embodiments, the method may further include storing the S parameter and ground code of the ground controller.

According to various example embodiments, the method may further include: identifying the reflection coefficient by applying the selected ground code to the at least one ground controller and applying the reference tuner code to the antenna tuner and updating the tuner code of the antenna tuner based on whether the at least one component of the antenna tuner operates based on whether the identified reflection coefficient has been changed.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

an antenna;

an antenna tuner;

a transceiver;

a power amplifier electrically connected to the antenna tuner and configured to perform power amplification based on an execution of impedance matching;

memory storing instructions; and at least one processor, comprising processing circuitry, operatively connected to the transceiver, the antenna tuner, and the power amplifier, wherein the instructions, when executed individually and/or collectively by the at least one processor, cause the electronic device to:

set a reference tuner code for the antenna tuner connected to the antenna in a signal path of the transceiver and identify a reflection coefficient of the antenna, compare the identified reflection coefficient of the antenna with a previous reflection coefficient of the antenna, based on a difference being present as a result of the comparison, identify, based on a coordinate of the identified reflection coefficient, whether a first switch of the antenna tuner is in an on state or an off state, based on the first switch being in the on state, maintain a first variable capacitor connected in series to the first switch at an existing value, and calculate a tuner code of the antenna tuner based on at least one of: (i) an on and/or off state of at least one other switch connected in parallel to the first switch, and (ii) a voltage change of a second variable capacitor connected in parallel to the first switch and perform the impedance matching of the antenna based on the calculated tuner code.

2. The electronic device of claim 1, wherein based on the first switch being in the off state, the instructions, when executed by at least one processor, cause the electronic device to:

maintain, as a maximum voltage, a value of the first variable capacitor connected in series to the first switch, and calculate the tuner code of the antenna tuner based on at least one of the on or off of at least another switch connected in parallel to the first switch and a change in a voltage of the second variable capacitor.

3. The electronic device of claim 1, wherein based on a difference not being present as a result of the comparison, the instructions, when executed by at least one processor, cause the electronic device to update the tuner code of the antenna tuner based on a change in a voltage of the first variable capacitor connected in series to the first switch of the antenna tuner.

4. The electronic device of claim 3, wherein the instructions, when executed by at least one processor, cause the electronic device to perform, based on the reflection coefficients of the antenna identified in different cycles, updating the tuner code based on a difference not being present and a difference being present as a result of the comparison.

5. The electronic device of claim 1, wherein the instructions, when executed by at least one processor, cause the electronic device to:

apply the reference tuner code to the antenna tuner, and select a ground code of at least one ground controller connected to a signal path of the antenna.

6. The electronic device of claim 5, wherein the instructions, when executed by at least one processor, cause the electronic device to:

apply the reference tuner code to the antenna tuner and determine a reference ground code of the at least one ground controller by measuring the at least one reflection coefficient, apply the reference tuner code to the antenna tuner, apply the reference ground code to the at least one ground controller, and measure a reflection coefficient for each of a plurality of use situations, calculate an S parameter of the at least one ground controller based on the measured reflection coefficients for the plurality of use situations, and determine the ground code of the ground controller based on the S parameter of the ground controller and the measured reflection coefficients.

7. The electronic device of claim 6, wherein the instructions, when executed by at least one processor, cause the electronic device to store the S parameter and ground code of the ground controller.

8. The electronic device of claim 6, wherein the instructions, when executed by at least one processor, cause the electronic device to:

check the reflection coefficient by applying the selected ground code to the at least one ground controller and applying the reference tuner code to the antenna tuner, and update the tuner code of the antenna tuner based on whether the at least one component of the antenna tuner operates based on whether the identified reflection coefficient has been changed.

9. A method of operating an electronic device comprising an antenna, comprising:

applying a reference tuner code to an antenna tuner connected to a signal path of an antenna, and identifying a reflection coefficient of the antenna;

comparing the identified reflection coefficient of the antenna with a previous reflection coefficient of the antenna;

based on a difference being present as a result of the comparison, identifying, based on a coordinate of the identified reflection coefficient, whether a first switch of the antenna tuner is in an on state or an off state;

based on the first switch being in the on state, maintaining a first variable capacitor connected in series to the first switch at an existing value; and calculating a tuner code of the antenna tuner based on at least one of (i) an on or off state of at least one other switch connected in parallel to the first switch and (ii) a voltage change of a second variable capacitor connected in parallel to the first switch; and performing impedance matching of the antenna based on the calculated tuner code.

10. The method of claim 9, further comprising, based on the first switch being om tje off state, maintaining, as a maximum voltage, a value of the first variable capacitor connected in series to the first switch, and calculating the tuner code of the antenna tuner based on at least one of the on or off of at least another switch connected in parallel to the first switch and a change in a voltage of the second variable capacitor connected in parallel to the first switch.

11. The method of claim 9, further comprising, based on a difference not being present as a result of the comparison, updating the tuner code of the antenna tuner based on a change in a voltage of the first variable capacitor connected in series to the first switch of the antenna tuner.

12. The method of claim 9, wherein updating the tuner code based on a difference not being present and a difference being present as a result of the comparison is performed based on the reflection coefficients of the antenna identified in different cycles.

13. The method of claim 9, further comprising:

applying the reference tuner code to the antenna tuner, and selecting a ground code of at least one ground controller connected to a signal path of the antenna.

14. The method of claim 13, wherein selecting the ground code further comprises:

applying the reference tuner code to the antenna tuner and determining a reference ground code of the at least one ground controller by measuring the at least one reflection coefficient;

applying the reference tuner code to the antenna tuner, applying the reference ground code to the at least one ground controller, and measuring a reflection coefficient for each of a plurality of use situations;

calculating an S parameter of the at least one ground controller based on the measured reflection coefficients for the plurality of use situations; and determining the ground code of the ground controller based on the S parameter of the ground controller and the measured reflection coefficients.

15. The method of claim 14, further comprising:

storing the S parameter and ground code of the ground controller.

16. The method of claim 14, further comprising:

checking the reflection coefficient by applying the selected ground code to the at least one ground controller and applying the reference tuner code to the antenna tuner, and updating the tuner code of the antenna tuner based on whether the at least one component of the antenna tuner operates based on whether the identified reflection coefficient has been changed.

* * * * *